United States Patent
Hampton

(10) Patent No.: US 8,090,997 B2
(45) Date of Patent: Jan. 3, 2012

(54) RUN-TIME FAULT RESOLUTION FROM DEVELOPMENT-TIME FAULT AND FAULT RESOLUTION PATH IDENTIFICATION

(75) Inventor: Mark C. Hampton, Newtown (AU)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/142,945

(22) Filed: Jun. 20, 2008

(65) Prior Publication Data

US 2009/0319823 A1 Dec. 24, 2009

(51) Int. Cl.
G06F 11/00 (2006.01)
(52) U.S. Cl. .......................................... 714/48; 714/26
(58) Field of Classification Search ............... 714/5, 42, 714/47, 48
See application file for complete search history.

(56) References Cited

U.S. PATENT DOCUMENTS

| | | | | |
|---|---|---|---|---|
| 4,922,491 A * | 5/1990 | Coale | | 714/26 |
| 6,487,677 B1 * | 11/2002 | Jantz et al. | | 714/2 |
| 6,718,489 B1 * | 4/2004 | Lee et al. | | 714/43 |
| 6,751,758 B1 * | 6/2004 | Alipui et al. | | 714/54 |
| 6,760,869 B2 * | 7/2004 | Lam | | 714/42 |
| 7,409,586 B1 * | 8/2008 | Bezbaruah et al. | | 714/13 |
| 2003/0177417 A1 * | 9/2003 | Malhotra et al. | | 714/42 |
| 2006/0053347 A1 * | 3/2006 | van Ingen et al. | | 714/47 |
| 2007/0174720 A1 * | 7/2007 | Kubo et al. | | 714/42 |
| 2008/0005609 A1 * | 1/2008 | Zimmer et al. | | 714/5 |
| 2008/0028264 A1 * | 1/2008 | Kerner et al. | | 714/42 |
| 2008/0115014 A1 * | 5/2008 | Vaidyanathan et al. | | 714/42 |
| 2008/0270842 A1 * | 10/2008 | Ho et al. | | 714/42 |

* cited by examiner

*Primary Examiner* — Yolanda L Wilson
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to fault handling and provide a method, system and computer program product for run-time fault resolution from development time fault and fault resolution path identification. In an embodiment of the invention, a method for run-time fault resolution from development time fault and fault resolution path identification can be provided. The method can include detecting a recoverable fault condition in a computing system, selecting a fault resolution path from amongst a multiple development time specified fault resolution paths to match the recoverable fault condition, prompting an operator with the selected fault resolution path, and resuming operation of the computing system without restart subsequent to the operator performing the selected resolution fault path.

17 Claims, 1 Drawing Sheet

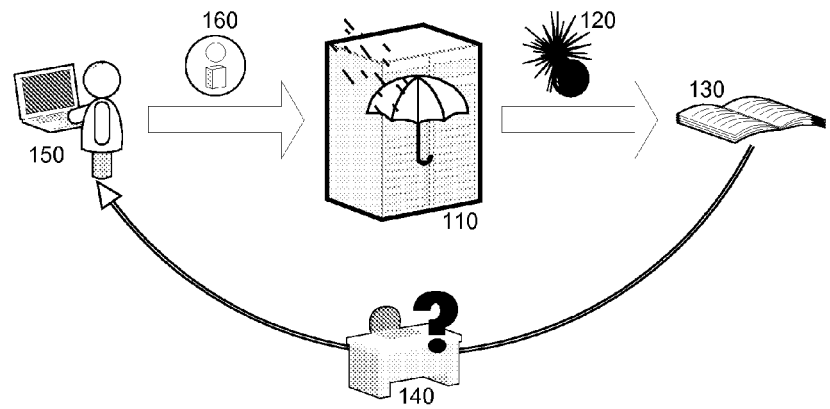
FIG. 1
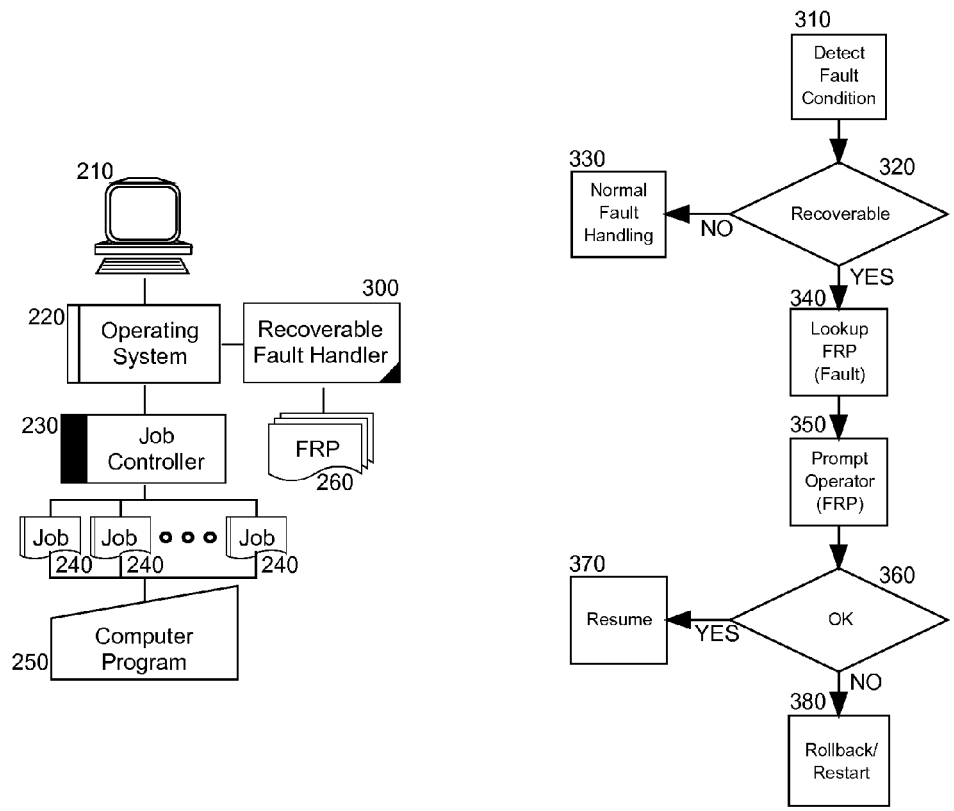
FIG. 2  FIG. 3

RUN-TIME FAULT RESOLUTION FROM DEVELOPMENT-TIME FAULT AND FAULT RESOLUTION PATH IDENTIFICATION

BACKGROUND OF THE INVENTION

1. Field of the Invention

The present invention relates to the field of fault handling in a computing system and more particularly to automated fault resolution.

2. Description of the Related Art

Computing systems continually grow in complexity each year. Managing the operation of a given computing system whether management relates to a computer program, supporting operating system, or intermediate job or job controller, can be a challenging task and oftentimes requires specific expertise. To provide assistance in addressing the complexity of management of a computing system, software developers anticipate faults in the computing system and hard code fault handling within the computing system itself. Additionally, technical writers often prepare assistive documentation addressing potential faults and fault resolution paths to be provided in concert with the operation of the computing system, for example as a help file.

The recognition of the occurrence of a fault in a computing system, the comprehension of prepared documentation addressing the occurrence of a fault, and the implementation of a fault resolution path recommended by the documentation can vary according to the expertise of one managing the computing system. Yet, in most instances, the expertise of computing support can vary from installation to installation so that developing of online accessible documentation can be a balancing act of supporting the most unsophisticated of users with limited but comprehensible information while providing enough detailed information for seasoned users. Further, end users must know how to correlate a fault condition with appropriate portions of the documentation.

Hard coding a computing system to address an encountered fault condition can be beneficial to the extent that the fault condition can be addressed without consideration for the technical sophistication of the end user. Oftentimes, automated fault handling logic upon detecting a fault merely rolls back the state of the computing system to a pre-fault state in order to provide a graceful exit. Additionally, automated fault handling logic can provide notification to an operator of the automated handling of the fault condition so that the operator can effectuate a restart of the computing system once the computing system has completed its graceful exit.

It is to be recognized, however, that many faults handled in an automated fashion resulting in a costly rollback and graceful exit otherwise can be avoided with a minimum of user interaction. Specifically, computing logic executing to a fault oftentimes can overcome the fault condition with a minimum of user interaction permitting a continuation of execution of the computing logic and avoiding the necessity of a restart. Conventional automated fault handling, however, does not always permit the interactivity of an operator once a fault condition has been addressed. Indeed, when interactivity is permitted, the choice for an operator usually is to confirm the termination of the computing system in the face of the detected fault.

BRIEF SUMMARY OF THE INVENTION

Embodiments of the present invention address deficiencies of the art in respect to fault handling and provide a novel and non-obvious method, system and computer program product for run-time fault resolution from development time fault and fault resolution path identification. In an embodiment of the invention, a method for run-time fault resolution from development time fault and fault resolution path identification can be provided. The method can include detecting a recoverable fault condition in a computing system, selecting a fault resolution path from amongst a multiple development time specified fault resolution paths to match the recoverable fault condition, prompting an operator with the selected fault resolution path, and resuming operation of the computing system without restart subsequent to the operator performing the selected resolution fault path.

In one aspect of the embodiment, detecting a recoverable fault condition in a computing system can include detecting a low resource condition in the computing system. In another aspect of the embodiment, prompting an operator with the selected fault resolution path can include prompting an operator to re-prioritize an existing job in the computing system, to terminate an existing job in the computing system, to pause operation of the computing system while adding new resources to the computing system, or to pause operation of the computing system while reallocating an existing resource to a different job in the computing system.

In another embodiment of the invention, a computer data processing system can be configured for run-time fault resolution from development time fault and fault resolution path identification. The system can include a host computing platform supporting an operating system and job controller. The system also can include a computer program executing in the operating system. The computer program can include multiple different jobs managed by the job controller. Finally, the system can include a recoverable fault handler. The recoverable fault handler can include program code enabled to detect a recoverable fault condition in the system, to select a fault resolution path from amongst a plurality of development time specified fault resolution paths to match the recoverable fault condition, to prompt an operator with the selected fault resolution path, and to resume operation of the system without restart subsequent to the operator performing the selected resolution fault path.

In one aspect of the embodiment, the recoverable fault handler can be coupled to the operating system. In another aspect of the embodiment, the recoverable fault handler can be coupled to the job controller. In yet another aspect of the embodiment, the recoverable fault handler can be coupled to the computer program. In even yet another aspect of the embodiment, the recoverable fault handler can be coupled to at least one of the jobs.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for run-time fault resolution from development time fault and fault resolution path identification;

FIG. 2 is a schematic illustration of a computer data processing system configured for run-time fault resolution from development time fault and fault resolution path identification; and, FIG. 3 is a flow chart illustrating a process for run-time fault resolution from development time fault and fault resolution path identification.

DETAILED DESCRIPTION OF THE INVENTION

Embodiments of the present invention provide a method, system and computer program product for run-time fault resolution from development time fault and fault resolution path identification. In accordance with an embodiment of the present invention, a recoverable fault condition can be detected within a computing system. The recoverable detected fault can be compared to a listing of known recoverable faults set forth at development time for the computing system and, if available, a corresponding fault resolution path can be identified. The identified fault resolution path can provide a step or sequence of steps requisite to clearing the fault condition without requiring a restart of the computing system. Thereafter, the fault resolution path can be presented to an operator through a user interface to the computing system. Finally, upon satisfaction of the fault resolution path, the execution of the computing system can continue without requiring a restart of the computing system.

In illustration, FIG. 1 pictorial shows a process for run-time fault resolution from development time fault and fault resolution path identification. As shown in FIG. 1, a computing system 110 can be configured for run-time fault resolution at development time to identify a fault resolution path for a detected recoverable fault in the computing system 100. In this regard, upon detecting a recoverable fault 120 in the computing system 110, a set of identifiable fault resolution paths 130 can be compared to the recoverable fault 120 in order to select a suitable fault resolution path 140. Thereafter, an operator 150 can be prompted with the selected suitable fault resolution path 140 which is turn can result in the operator 150 providing requisite information 160 to the computing system 100 to overcome the recoverable fault 120. In this way, a costly rollback and restart can be avoided.

In further illustration, FIG. 2 is a schematic illustration of a computer data processing system configured for run-time fault resolution from development time fault and fault resolution path identification. The system can include a host computing platform 210 supporting the operation of an operating system 220. The operating system 220 in turn can manage the execution of a computer program 250 that can spawn multiple different jobs 240 to be managed in execution by a job controller 230. As it will be recognized by the skilled artisan, job controller 230 can include a configuration for queuing job 240 for execution and also for placing jobs 240 in different hosts (whether virtual or actual) for execution in a distributed computing model.

Recoverable fault handler 300 can be coupled to the operating system 220 either as separate computing logic, for instance in a linked library, or as standalone logic cooperatively executing with the operating system 220. Alternatively, the recoverable fault handler 300 can be coupled to the job controller 230, one or more of the jobs 240, or to the computer program 250. The recoverable fault handler 300 can include a set of fault resolution paths 260, each providing a step or sequence of steps requisite to clearing a corresponding fault condition in a computing system without requiring a restart of the computing system, for example a host computing platform 210, the operating system 220, the job controller 230, a given one of the jobs 240, or even the computer program 250.

To that end, the recoverable fault handler 300 can include program code which when executed in the host computing platform 210, identifies a recoverable fault condition, locates a corresponding one of the fault resolution paths 260 and presents the located corresponding one of the fault resolution paths 260 to an external operator to provide both guidance as to clearing the recoverable fault condition and also to solicit additional input from the operator requisite to clearing the recoverable fault condition. For instance, the additional input can include the operator commanding the re-prioritization of individual ones of the jobs 240, the termination of selected ones of the jobs 240, or the pausing of selected ones of the jobs 240. Also, the additional input can include the adding of computing resources like memory or disk space while pausing the processing of one or more of the jobs 240, or the re-allocation of existing computing resources while pausing the processing of one or more of the jobs 240.

In even yet further illustration of the operation of recoverable fault handler 300, FIG. 3 is a flow chart illustrating a process for run-time fault resolution from development time fault and fault resolution path identification. Beginning in block 310, a recoverable fault condition can be detected. The fault condition can include by way of example, excessive disk thrashing or low computing resources conditions like low memory. In block 320, it can be determined whether or not the fault condition is recoverable in the sense that a restart can be avoided in consequence of the fault condition. If not, in block 330 ordinary fault handling can be performed resulting in a restart of the computing system. Otherwise, the process can continue through block 340.

In block 340, a fault resolution path can be matched to the recoverable fault condition and in block 350, an external operator can be prompted with the matched fault resolution path. Operator input can be provided consistent with the matched resolution path, such as a suggested commanding of the re-prioritization of individual jobs, the termination of selected jobs, or the pausing of selected jobs. Also, the operator input can be consistent with the adding of computing resources like memory or disk space while pausing the processing of one or more jobs, or the re-allocation of existing computing resources while pausing the processing of one or more of the jobs. Thereafter, in decision block 360 if the operator input is provided as prompted, in block 370 the operation of the computing system can continue. Otherwise, in block 380 rollback and restart can be performed on the computing system.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for run-time fault resolution from development time fault and fault resolution path identification, the method comprising:
    detecting a recoverable fault condition in a computing system;
    selecting a fault resolution path from amongst a plurality of development time specified fault resolution paths to match the recoverable fault condition, each path providing at least one step requisite to clearing a corresponding fault condition in a computing system without requiring a restart of the computing system;
    prompting an operator with the selected fault resolution path; and,
    resuming operation of the computing system without restart subsequent to the operator performing the selected resolution fault path.

2. The method of claim 1, wherein detecting a recoverable fault condition in a computing system, comprises detecting a low resource condition in the computing system.

3. The method of claim 1, wherein prompting an operator with the selected fault resolution path, comprises prompting an operator to re-prioritize an existing job in the computing system.

4. The method of claim 1, wherein prompting an operator with the selected fault resolution path, comprises prompting an operator to terminate an existing job in the computing system.

5. The method of claim 1, wherein prompting an operator with the selected fault resolution path, comprises prompting an operator to pause operation of the computing system while adding new resources to the computing system.

6. The method of claim 1, wherein prompting an operator with the selected fault resolution path, comprises prompting an operator to pause operation of the computing system while reallocating an existing resource to a different job in the computing system.

7. A computer data processing system configured for run-time fault resolution from development time fault and fault resolution path identification, the system comprising: a memory, said memory comprising: a host computing platform supporting an operating system and job controller; a computer program executing in the operating system, the computer program comprising a plurality of jobs managed by the job controller; and, a recoverable fault handler comprising program code enabled to detect a recoverable fault condition in the system, to select a fault resolution path from amongst a plurality of development time specified fault resolution paths to match the recoverable fault condition, to prompt an operator with the selected fault resolution path, and to resume operation of the system without restart subsequent to the operator performing the selected resolution fault path, each path providing at least one step requisite to clearing a corresponding fault condition in a computing system without requiring a restart of the computing system.

8. The system of claim 7, wherein the recoverable fault handler is coupled to the operating system.

9. The system of claim 7, wherein the recoverable fault handler is coupled to the job controller.

10. The system of claim 7, wherein the recoverable fault handler is coupled to the computer program.

11. The system of claim 7, wherein the recoverable fault handler is coupled to at least one of the jobs.

12. A computer program product comprising a non-transitory computer usable medium embodying computer usable program code for run-time fault resolution from development time fault and fault resolution path identification, the computer program product comprising:
    computer usable program code for detecting a recoverable fault condition in a computing system;
    computer usable program code for selecting a fault resolution path from amongst a plurality of development time specified fault resolution paths to match the recoverable fault condition, each path providing at least one step requisite to clearing a corresponding fault condition in a computing system without requiring a restart of the computing system;
    computer usable program code for prompting an operator with the selected fault resolution path; and,
    computer usable program code for resuming operation of the computing system without restart subsequent to the operator performing the selected resolution fault path.

13. The computer program product of claim 12, wherein the computer usable program code for detecting a recoverable fault condition in a computing system, comprises computer usable program code for detecting a low resource condition in the computing system.

14. The computer program product of claim 12, wherein the computer usable program code for prompting an operator with the selected fault resolution path, comprises computer usable program code for prompting an operator to re-prioritize an existing job in the computing system.

15. The computer program product of claim 12, wherein the computer usable program code for prompting an operator with the selected fault resolution path, comprises computer usable program code for prompting an operator to terminate an existing job in the computing system.

16. The computer program product of claim 12, wherein the computer usable program code for prompting an operator with the selected fault resolution path, comprises computer usable program code for prompting an operator to pause operation of the computing system while adding new resources to the computing system.

17. The computer program product of claim 12, wherein the computer usable program code for prompting an operator with the selected fault resolution path, comprises computer usable program code for prompting an operator to pause operation of the computing system while reallocating an existing resource to a different job in the computing system.

* * * * *